United States Patent Office 3,817,894
Patented June 18, 1974

3,817,894
SILICONE LATEX CAULK
Anthony J. Butler, Greensboro, N.C., and Craig E. Graham, Saginaw, and Martin C. Musolf, Midland, Mich., assignors to The Dow Corning Corporation, Midland, Mich.
No Drawing. Filed Aug. 10, 1972, Ser. No. 279,423
Int. Cl. C08g 31/09, 47/10
U.S. Cl. 260—29.2 M          4 Claims

ABSTRACT OF THE DISCLOSURE

A composition is disclosed consisting essentially of a siloxane copolymer, water, a filler, surfactants and an aminofunctional silane which is useful, inter alia, as a caulk.

---

There are numerous products on the market which are sold as sealants, adhesives and caulks. Some of these products are based on siloxane polymers. In spite of the fact that the available silicone based products are durable and are non-hardening or have rubbery properties, these products still have shortcomings. For example, one of the most successful of these products gives off an obnoxious, pungent, acetic acid or vinegar odor during application and cure. Also, the present products have poor extrusion rates making application, working and clean up difficult. A further problem is that the products when cured have excellent release characteristics making them non-paintable.

It is an object of this invention to provide a composition which is useful as an adhesive, sealant, caulk, filling voids, or in the like uses, which composition has the desirable properties of durability and non-hardening of the heretofore available products but which is substantially free of their shortcomings.

More specifically, this invention relates to a composition which consists essentially of (a) 300 to 600 parts by weight of a siloxane copolymer consisting essentially of 80 to 95 mole percent of $(CH_3)_2SiO$ units and 5 to 20 mole percent of $C_6H_5SiO_{3/2}$ units, (b) 250 to 300 parts by weight of water, (c) 20 to 30 parts by weight of a cationic surfactant, (d) 5 to 30 parts by weight of a nonionic surfactant, (e) 300 to 1000 parts by weight of at least one filler, and (f) 5 to 20 parts by weight of an aminofunctional silane.

Component (a) of the composition is a siloxane copolymer consisting essentially of 80 to 95 mole percent of dimethylsiloxane, $(CH_3)_2SiO$, units and 5 to 20 mole percent of phenylsilsesquioxane, $C_6H_5SiO_{3/2}$, units. It is believed that best results are obtained when this component is a block copolymer of the ABA type where A represents the linear dimethylsiloxane portion and B represents the phenylsilsesquinoxane portion. The overall copolymer structure would, of course, be non-linear. Other factors have also been found to be critical for obtaining optimum performance. For example, the tensile strength of the final cured polymer tends to increase fairly rapidly as the viscosity of the dimethylsiloxane approaches 6000 centipoises at 25° C., and more gradually after that point. Also, the tensile strength tends to increase rapidly as the content of phenylsilsesquioxane units approaches 20 mole percent. However, with increasing phenylsilsesquioxane content, the emulsion stability or the amount of copolymer solids which can be tolerated in the emulsion tends to decrease. With less than 5 mole percent of phenylsilsesquioxane units present it is generally not possible to obtain the requisite tensile strengths.

So far as is known at this time the best, if not only, method for preparing component (a) is by an emulsion polymerization process. Copolymers prepared by other processes and then mechanically emulsified tend to be considerably less stable and more difficult to cure. The best method known for preparing component (a) involves the preparation of a mixture of dimethylsiloxane cyclics (preferably mostly octamethyltetracyclosiloxane), surfactant and water which mixture is then homogenized. The resulting cyclics or monomer emulsion is then placed in a suitable reaction vessel where more water, surfactants and a base are added, and then the mixture equilibrated until a dimethylsiloxane of the desired molecular weight and viscosity is obtained. This is, of course, controlled by the time and temperature of the equilibration. Next a monophenylsilane (preferably phenyltrimethoxysiloxane) is added and reacted with the previously formed dimethylsiloxane to form the copolymer. When this reaction is complete the emulsion is neutralized with acid. The resulting copolymer is believed to contain residual silanol groups which aid in the crosslinking and curing of the polymer during use of the compositions of this invention into which it is incorporated.

Component (b) of the composition is water. The primary source of this component is from the emulsion of component (a). The amount of water can be controlled by diluting or concentrating the emulsion of component (a). also, water may be introduced into the composition by using it as a carrier for other ingredients, e.g. components (c) (d) and (f), when they are introduced into the composition. The presence of water and its amount is important to the composition of this invention as it contributes to the consistency, flow characteristics, and handling or working characteristics of the composition. Also, for best results the water employed in making the emulsion (a) should be distilled, deionized or demineralized.

Component (c) of the instant composition is a cationic surfactant. Cationic surfactants are generally characterized by the fact that upon ionization a positive charge resides in that portion of the molecule containing the long hydrocarbon moiety. Associated with this cation is a negatively charged ion, usually, though not necessarily, a halide, acetate, methosulfate or hydroxyl. Illustrative of the broad class of cationic surfactants are the arsonium, phosphonium, isothiouronium, hydrazonium, alkyl ammonium and quaternary ammonium salts, the latter two types being the most important. Thus it can be seen that the cationic surfactants can be divided, roughly, into nitrogen and non-nitrogen containing compounds. Specific examples of cationic surfactants which can be employed in the present invention include aliphatic fatty amines and their derivatives such as dodecylamine acetate, octadecylamine acetate and acetates of the amines of tallow fatty acids; homologs of aromatic amines having fatty chains such as dodecylanalin; fatty amides derived from aliphatic diamines such as undecylimidazoline; fatty amides derived from disubstituted amines such as oleylaminodiethylamine; derivatives of ethylenediamine; quaternary ammonium compounds such as dioctadecyldimethyl ammonium chloride, didodecyldimethyl ammonium chloride and dihexadecyldimethyl ammonium chloride; amide derivative of amino alcohols such as beta-hydroxyethylstearylamide; amine salts of long chain fatty acids; quaternary ammonium based derived from fatty amides of disubstituted diamines such as oleylbenzylaminoethylene diethylamine hydrochloride; quaternary ammonium bases of the benzimidazolines such as methylheptadecyl benzimidazol hydrobromide, basic compounds of pyridinium and its derivatives such as cetylpyridinium chloride; sulfonium compounds such as octadecylsulfonium methyl sulfate; quaternary ammonium compounds of betaine such as betaine compounds of diethylamine acetic acid and octadecylchloromethyl ether; urethanes of polyalkylenepolyamines such as the condensation products of stearic acid and diethylenetriamine; polyethylene diamines; and polypropanolpolyethanol amines.

Component (d) of this composition is a nonionic surfactant. A nonionic surfactant is one which produces electrically neutral particles in solution. Specific examples of such surfactants include saponines; condensation products of fatty acids with ethylene oxide such as the dodecyl ether of tetraethylene oxide; condensation products of ethylene oxide and sorbitan monolaurate; condensation products of ethylene oxide and sorbitan trioleate; condensation products of phenolic compounds having side chains with ethylene oxide such as condensation products of ethylene oxide with isododecylphenol; and imine derivatives such as polymerized ethylene imine and N-octadecyl-N,N'-ethylene imide. The nonionic surfactant is used along with the cationic surfactant in the preparation of component (a). It is best to add the nonionic surfactant at the outset when the dimethylsiloxane cyclics are homogenized. Component (d) is believed essential to the preparation of a stable, small particle size copolymer emulsion which is needed to prepare a high solids, smooth, high consistency composition of this invention.

Component (e) of this composition is composed of at least one filler. The primary filler employed is a wet ground calcium carbonate which functions as an extending agent. But other fillers such as silicas, diatomaceous earths and talcs can also be used. These fillers are essential to the composition in that they reduce the shrinkage and cracking of the product when cured. A second filler which can be used is a pyrogenic colloidal silica produced by the vapor phase hydrolysis of silicon tetrachloride. The presence of this second filler is not essential to the composition but is employed when it is desired to impart thixotropic properties to the composition, i.e., make it non-slumping, or when reinforcement is desired. The third, and also optional filler which can be employed is titanium dioxide. The function of this filler is primarily that of a whitening agent. If a composition with a color other than white is desired, another appropriate pigment can be used but would have to be tested in the composition to make sure it had no deleterious effects on the properties of the cured product obtained. Generally speaking, the primary extending filler will constitute from 85 to 100 percent by weight of component (e), the second thixotropic/reinforcing filler will constitute from 0 to 2 percent by weight of component (e), and the third whitening filler will constitute from 0 to 10 perecnt by weight of component (e).

The final component of the composition of this invention, designated (f), is an aminofunctional silane. This component serves two important functions in the composition. More specifically, (f) functions as both a crosslinking agent and curing catalyst for component (a). The preferred aminofunctional alkoxy silanes are those encompassed by the general formula $(RO)_3SiR'NHR''$ wherein R is an alkyl group containing from 1 to 4 carbon atoms, R' is an alkylene group containing from 3 to 18 carbon atoms, there being at least three carbon atoms of the R' group between the silicon atom and the nitrogen atom, and R'' is a hydrogen atom, a hydrocarbon radical free of aliphatic unsaturation containing from 1 to 6 carbon atoms, or an aminoalkyl radical containing from 2 to 6 carbon atoms.

Small amounts of additives such as coalescing aids, fungicides or mildewcides can be incorporated into this composition so long as they have no undesirable or intolerable effects on the properties of the composition.

The compositions of this invention are best prepared in the following manner. To an emulsion of component (a) prepared as described above there is added, with agitation, any additional surfactants to be employed and then any additives. Next the filler(s) are added and mixed in, and finally the aminofunctional silane is mixed in. Various kinds of low speed, high shear mixing equipment, such as the Sigma blade or Ross mixer, can be used. High speed mixers have been found generally to cause gelation of the composition. After the composition has been prepared it is promptly placed in suitable containers so that it will retain its toothpaste-like consistency and flow until ready for use. The composition can be stored in this manner and is stable for a year or more at normal room temperature conditions. Upon removal of the composition from the container and evaporation of water from the composition, it cures to a rubbery state.

Now in order that those skilled in the art may better understand how the present invention can be practiced, the following examples are given by way of illustration and not by way of limitation. All parts and percents referred to herein are by weight, and all viscosities measured at 25° C., unless otherwise specified.

EXAMPLE 1

Four adhesive/sealant compositions were evaluated for performance. The first composition, which represents the preferred embodiment of the present invention, consisted essentially of 850 parts of an emulsion of a siloxane block copolymer composed of about 92 mole percent $(CH_3)_2SiO$ units and about 8 mole percent $C_6H_5SiO_{3/2}$ units, 10 parts of a 70% solution of octyl phenoxy polyethoxy ethanol in water, 12 parts of ethylene glycol (freeze-thaw additive), 0.1 part of 10,10'-oxybisphenoxyarsine, 10.7 parts of a 70% solution of

$$(C_2H_5O)_3SiCH_2CH_2CH_2NH_2$$

in water, 8.5 parts of a pyrogenic silica filler, 780 parts of wet ground calcium carbonate filler, and 50 parts of titanium dioxide filler/whitening agent. The emulsion of the siloxane copolymer used was prepared from 51.3% of $[(CH_3)_2SiO]_4$, 12.0% of $C_6H_5Si(OCH_3)_3$, 12.0% of a 25% solution of tallow trimethylammonium chloride in water, 1.7% of a 70% solution of octyl phenoxy polyethoxy ethanol in water, and 23.0% of deionized water. Preparation involved the following steps: first, the dimethylsiloxane cyclics, water, nonionic surfactant solution and one-half the cationic surfactant solution were homogenized by passing the mixture through a homogenizer once at 3000 p.s.i. and then twice at 4500 p.s.i. Then the other half of the cationic surfactant solution was added and the pH of the emulsion adjusted to 11 using 20% aqueous sodium hydroxide. The emulsion was then heated to 85° C. and held there for about 2 hours, then cooled to 72° C. and held there for 16 hours. Next the emulsion was cooled to 32° C. and then phenyltrimethoxysilane was slowly added over a 2½ hour period followed by mixing for another 2 hours. Finally the emulsion was neutralized to a pH of 7 with glacial acetic acid. The resulting emulsion contained about 56.5% of the siloxane copolymer solids.

The second composition evaluated was a currently available commercial polyvinyl acetate based latex caulk/adhesive.

The third composition evaluated was a currently available commercial acrylic based latex caulk/adhesive.

The fourth composition evaluated was a currently available commercial silicone rubber bathtub caulk based on an acetoxyfunctional silicone polymer.

Compositions 2, 3 and 4 were included for purposes of comparison.

The following tests were used to evaluate the above compositions.

(I) Shrinkage

In this test beads were cured for 7 days at 25° C. and 50% relative humidity. Duplicate samples were prepared. Visual shrinkage was also evaluated by placing caulk samples into joints ¼" wide by ¼" deep and letting cure for 7 days at room temperature. The degree of concavity of the bead was then judged as visual shrinkage. Other changes in the bead such as cracking were also noted.

(II) Adhesion

For dry adhesion, beads of caulk were pulled down on a substrate and cured at room temperature for 3, 7 and 30 days. The following subjective rating system was used:
Excellent—caulk could not be pulled off substrate.
Good—85% of caulk could not be pulled off substrate, any failure that occurred was cohesive.
Fair—some difficulty in pulling caulk off substrate, mostly adhesive failure.
Poor—caulk easily pulled off substrate, complete adhesive failure.

The painted wood samples were given two coats of paint with 24 hours dry time between coats and a final dry time of 7 days before caulk was applied. Both bead and small circular blobs of caulk were used in this testing.

Wet adhesion was measured by curing small blobs of caulk on 1" x 1" ceramic tiles. These were submerged in water for 1 hour, 4 hours, 8 hours and 24 hours. Adhesion was subjectively measured after each period of submersion.

(III) Tooling Time

Forms were prepared by nailing 5½" x ¾" x 5' boards at right angles, then gluing two rows of ceramic tile butted at right angles onto the boards. Beads of caulk were placed into the joints (6" long) and tooled every 10 minutes.

A variety of instruments were used for tooling.

(IV) Paintability

Caulk samples (both films and beads) were cured for 1 hour, 4 hours, 24 hours, and 7 days. Paintability was measured as the adhesion of the paint film to the caulk surface. Adhesion was determined subjectively by pressing Scotch tape down on the cured paint film (24 hours room temperature cure). The percent paint film removed was used in judging the relative degree of paintability.

(V) Scrubbability

Caulk joints ½" wide were sandwiched between ceramic tile and cured for 24 hours, 3 and 7 days. Initial testing was done with a stiff scrub brush and water. The joints were later scrubbed with cleaners and detergents. Samples were checked for abrasion resistance, coloration changes, and changes in adhesion.

(VI) Exposure (A) Weather-Ometer.—Samples cured 24 hours at room temperature were initially run for 300 hours with 102 minutes of ultraviolet light and 18 minutes of ultraviolet light with a deionized water spray. A cursory examination was made every 24 hours and a thorough one every 300 hours. Samples that passed the 300 hours testing were run for 600 and 900 hours.

(B) Exterior.—Caulk slabs 3" x 12" cured 24 hours inside were placed in 45° angle racks on a building roof facing southeast. Checks were made for coloration, cracking, and dirt pickup. Samples are to be run 1 year with checks made every 30 days.

Beads of caulk were also placed in 4" to 6" joints of various substrates on a building roof.

(C) Interior.—Joints and cracks were filled in a building lab area and also the men's lavatory. These applications are checked every 30 days.

(D) Closed atmospheres of $SO_2$ and $H_2S$.—Caulk samples were cured for 7 days at room temperature then cut into 1½" x 2" squares. The gasses were generated in a closed desiccator. Caulk condition was checked after 24, 48, 72, 96 hours and 7 days continuous exposure.

(VII) Product Stability

All products were tubed in 6 oz., unlined lead tubes. They were placed in the following conditions: room temperature, 120° F., 150° F., refrigerator, and freezer. Properties checked were weight loss, appearance, cure properties, tooling and adhesion to ceramic tile after 3 and 7 days.

The test results are set forth in the following series of tables.

TABLE I.—SHRINKAGE TEST

| Composition | Percent non-volatile materials | Percent filler(s) | Density, g./cc. | Specific volume, ml./g. | Percent shrinkage | Visual shrinkage |
|---|---|---|---|---|---|---|
| 1 | 78.0 | 63 | 1.45 | 0.665 | 36.1 | Moderate. |
| 2 | 69.7 | Unknown | 1.40 | 0.701 | 38.9 | Severe. |
| 3 | 85.1 | 78 | 1.58 | 0.593 | 28.4 | Slight. |
| 4 | 96.5 | 9 | 1.02 | 0.976 | 6.3 | None. |

TABLE II.—ADHESION TEST

| | Composition 1 | | | Composition 2 | | | Composition 3 | | | Composition 4 | | |
|---|---|---|---|---|---|---|---|---|---|---|---|---|
| Days | 3 | 7 | 30 | 3 | 7 | 30 | 3 | 7 | 30 | 3 | 7 | 30 |
| Substrate: | | | | | | | | | | | | |
| Ceramic tile | G[1] | G | G | F-P[2] | F[3] | F | F-P | F-P | F | E[4] | E | E |
| Plastic tile | F | F | F | G | G | G+ | G | G | G | G+ | G-F | F |
| Plexiglas | P | P | P | G | G | G | F-P | F | F | G | G | G |
| Polystyrene | P | P | F | G-F | G-F | G-F | G-F | G-F | G-F | G-F | G-F | P |
| Polyvinylchloride | F | G-F | F | G-F | G-F | G | F | F | F | G | G | E |
| Unglazed ceramic tile | G | G | G | F-P | F | F | P | F | F | E | E | E |
| Glass | G | G | G | F-P | F-P | P | G-F | G-F | F | E | F | F |
| Steel | G-F | G-F | G-F | F | F | P | F | F | F | F | F | F |
| Aluminum | G | G | G | P | P | P | F-P | F | F | F | F | G-F |
| Copper | G-F | G | G | P | F | G | G | G | G | E | E | E |
| Brass | G | G | G | P | G | G | F | G | G | E | G | E |
| Linoleum | P | P | P | P | P | P | F-P | F-P | F | E | E | E |
| Asbestos tile | G | G | G | G-F | G-F | F | F | F | F | E | E | E |
| Vinyl tile | G-F | G-F | G-F | G-F | G | G | G-F | G-F | G | E | E | E |
| Filled travertine | P | P | P | F-P | P | P | P | P | P | F-P | E | E |
| Green slate | F | F | F | P | P | P | P | P | P | E | E | E |
| Black marble | F | F | F | P | P | P | P | P | P | E | E | E |
| Terazzo | E | E | E | F | G | E-G | G | G | E-G | E | E | E |
| Melamine counter top | G-F | G | G | P | P | P | P | P | P | E | E | E |
| Red brick° | P | P | P | P | P | P | G-F | G-F | F | G | G | G |

[1] Good.   [2] Poor.   [3] Fair.   [4] Excellent.

TABLE III.—ADHESION ON PAINTED WOOD

| | Composition | | | | | | | | | | | |
|---|---|---|---|---|---|---|---|---|---|---|---|---|
| | 1 | | | 2 | | | 3 | | | 4 | | |
| Days | 3 | 7 | 30 | 3 | 7 | 30 | 3 | 7 | 30 | 3 | 7 | 30 |
| Substrate: | | | | | | | | | | | | |
| Soft pine, unpainted | G[1]-F[2] | G | G | G | E[3] | E | G | G | G | E | E | E |
| Oil-based: | | | | | | | | | | | | |
| Semi-gloss | G-F | G | G | P[4] | P | P | P | F | G | E | E | E |
| Exterior | G-F | G | G | P | P | P | P | F | P | E | E | E |
| Floor Enamel | G-F | G | G | F-P | P | P | P | F | G-F | E | E | E |
| Enamel | F | G | G | P | P | P | P | P | F-P | E | E | E |
| Latex—Exterior | G-F | G | G | F | F | F | E | G | G-F | E | E | E |
| Latex—Flat | G | E-G | E | P | P | P | E | G | G-F | E | E | E |
| Latex—Interior enamel | G | G | E-G | P | P | P | P | P | F-P | E | E | E |

[1] Good.  [2] Fair.  [3] Excellent.  [4] Poor.

TABLE IV.—CAULK ADHESION TO CERAMIC TILE UNDER VARIOUS CONDITIONS

| | Composition | | | | | | | | | | | |
|---|---|---|---|---|---|---|---|---|---|---|---|---|
| | 1 | | | 2 | | | 3 | | | 4 | | |
| Days | 3 | 7 | 30 | 3 | 7 | 30 | 3 | 7 | 30 | 3 | 7 | 30 |
| Substrate: | | | | | | | | | | | | |
| Room temperature (~70° F.) | G | G | E-G | P | P | F | P | P | F | E | E | E |
| Oven (120° F.) | G | G | G | F-P | F | G | F-P | P | P[5] | E | E | E |
| Refrigerator (0° C.) | P[1] | P | P | P | P | P | P | P | P | E | E | E |
| Humidity cabinet (100° F., 100% R.H.) | VP | VP | VP | VP[2] | VP | VP | VP | VP | VP | E[3] | E | E |
| Constant temp.—Humidity room (25° C., 50% R.H.) | G | G | E-G | P | P | F | P | P | F | E | E | E |
| Low humidity (100° F., desiccator) | F-P | P | P | F | F | G | P[4] | P | P | E | E | E |

[1] Easily pulled off.
[2] Caulk dissolved.
[3] Dulled appearance.
[4] Severe yellowing.
[5] Yellowed.

NOTE:
G=Good.
E=Excellent.
P=Poor.
F=Fair.
VP=Very poor.

TABLE V.—TOOLING TIME

| Tooling instrument | Compositions | | | |
|---|---|---|---|---|
| | 1 | 2 | 3 | 4 |
| Finger with water | 60+ minutes—V. smooth bead | 20 minutes—Difficult to smooth. | 30 minutes—Air pockets | 7-10 minutes—Difficult to smooth. |
| Finger without water | 20-30 minutes | 20 minutes | 10 minutes | 5-10 minutes—Rough surface. |
| Ice cream stick | do | do | 20 minutes | Do. |
| Metal spatula | 30 minutes | 10 minutes—V. poor tooling | 40 minutes—Fair tooling, air pockets. | 10 minutes—Poor tooling. |
| Tube nozzle | 2-30 minutes—Initially does good job, but could not go over. | 10 minutes—Poor tooling | 20-30 minutes—Fair tooling | Do. |
| Plastic spoon | 20-30 minutes | 20 minutes—Good tooling | 10 minutes—Good tooling | Do. |

TABLE VI.—PAINTABILITY TEST

| | | Adhesion and appearance of paints to caulk films—Caulk Cure Times | | | |
|---|---|---|---|---|---|
| Composition | Paint type | 1 hour | 4 hours | 24 hours | 7 days |
| 1 | Latex—Interior | Fair—Surface too soft | Good | Good | Good. |
| | Latex—Exterior | Fair—Good-Surface too soft | do | do | Do. |
| | Oil base—Interior | do | do | do | Do. |
| | Oil base—Exterior | Fair—Surface too soft | do | do | Do. |
| 2 | Latex—Interior | Excellent | Excellent | Excellent | Excellent. |
| | Latex—Exterior | Excellent—Severe cracking | Excellent—Slight cracking. | Excellent Slight cracking. | Excellent—Slight cracking. |
| | Oil base—Interior | Excellent | Excellent | Excellent | Excellent. |
| | Oil base—Exterior | do | do | do | Do. |
| 3 | Latex—Interior | Good—Surface too soft | Good | Good | Good. |
| | Latex—Exterior | do | Excellent | Excellent | Excellent. |
| | Oil base—Interior | do | Good | Good | Good. |
| | Oil base—Exterior | do | Excellent | Excellent | Excellent. |
| 4 | Latex—Interior | Poor—Fish eyeing | Poor | Poor | Poor. |
| | Latex—Exterior | do | do | do | Do. |
| | Oil base—Interior | do | do | do | Do. |
| | Oil base—Exterior | do | do | do | Do. |

TABLE VII.—WEATHEROMETER EXPOSURE

| Composition | Hours | Starting durometer* | Durometer* at the end of time period | Comments on caulk condition |
|---|---|---|---|---|
| 1 | 300 | 34 | 50 | Very flexible; white; no cracking. |
|   | 600 |    | 60 | Very flexible; dull white appearance. |
|   | 900 |    | 64 | Flexible; no cracking or coloration. |
| 2 | 300 | 60 | 90 | Severe cracking; very stiff and brittle. (Test discontinued after 300 hours for this sample). |
|   | 600 |    |    |  |
|   | 900 |    |    |  |
| 3 | 300 | 40 | 66 | Flexible; slight yellowing. |
|   | 600 |    | 75 | Stiff; surface crazing. |
|   | 900 |    | 90 | Very stiff; severe surface cracking. |
| 4 | 300 | 25 | 26 | No change in caulk; very flexible; white. |
|   | 600 |    | 26 | No change in caulk appearance. |
|   | 900 |    | 27 | Dull appearance; very flexible. |

*Measured by ASTM Test D676-58T, Shore A.

TABLE VIII.—EXTERIOR EXPOSURE
[Caulk condition; Appearance and adhesion]

| Caulk use | Exposure time (days) | Composition 1 | 2 | 3 | 4 |
|---|---|---|---|---|---|
| 3″ x 12″ film | 30 | G[1], sl. dirt pick-up | White, hard and brittle | Sl. dirt pick up | G, sl. dirt pick-up. |
|  | 60 | NC | Severe cracking | NC[2] | NC. |
|  | 90 | NC | do | NC | Severe dirt pick-up |
| Joint; Aluminum to aluminum | 30 | G, sl. dirt pick-up | Severe slump | P[3] Ad.[4], sl. dirt pick-up | G, sl. dirt pick-up |
|  | 60 | NC | Ad. failure | Improved Ad | NC. |
|  | 90 | NC | NC | Severe dirt pick-up | NC. |
| Joint; Old painted wood to wood | 30 | F[5] Ad | Severe slump, P Ad | Tacky, dirt pick-up | P Ad. |
|  | 60 | Sl. dirt pick-up | Ad. failure | NC | Sl. dirt pick-up. |
|  | 90 | NC | Caulk fell out joint | Severe dirt pick-up | NC. |
| Joint; Aluminum to bldg. block | 30 | G Ad | Severe slump | P Ad | G–E[3] Ad. |
|  | 60 | NC | NC | Dirt pick-up | NC. |
|  | 90 | NC | NC | NC | Sl. dirt pick-up. |
| Joint; Cement to building block | 30 | G Ad | Severe slump | Surface crazing | G–EAd. |
|  | 60 | NC | NC | NC | NC. |
|  | 90 | NC | NC | Dirt pick-up | Sl. dirt pick-up. |
| Joint; Painted steel | 30 | G, Sl. dirt pick-up | P Ad | P Ad | E Ad. |
|  | 60 | NC | Sl. dirt pick-up | Dirt pick-up | Sl. dirt pick-up. |
|  | 90 | NC | NC | NC | NC. |
| Joint; Aluminum to fiberglass | 30 | G Ad | Severe slump | P Ad | E Ad. |
|  | 60 | NC | NC | Sl. dirt pick-up | Sl. dirt pick-up. |
|  | 90 | NC | NC | NC | NC. |
| Crack in building block | 30 | G Ad | Severe slump | Dirt pick-up | E Ad. |
|  | 60 | Sl. dirt pick-up | Cracking | NC | Sl. dirt pick-up. |
|  | 90 | NC | Caulk fell out joint | NC | Dirt pick-up. |
| Adhesion to painted bldg. block-bead | 30 | G | F | G | E. |
|  | 60 | G | P | F | E. |
|  | 90 | G | P | F | E. |
| Adhesion to steel panel-bead | 30 | F–G | P | F, Rusting | E. |
|  | 60 | F | P | F | E. |
|  | 90 | F | P | F | E. |
| Adhesion to roofing shingles-bead | 30 | F | P | P | G. |
|  | 60 | F | P | P | G. |
|  | 90 | P | P | P | G. |

[1] Good. [2] No change. [3] Poor. [4] Adhesion. [5] Fair. [6] Excellent.

TABLE IX.—EXPOSURE TO $SO_2$ AND $H_2S$
[Caulk condition]

| Exposure gas | Exposure time | Composition 1 | 2 | 3 | 4 |
|---|---|---|---|---|---|
| $SO_2$ | 24 hours | White, flexible | Sl. blistering, v. sl. yellowing | Severe blistering, sl. yellowing | White, flexible, no change. |
|  | 48 hours | White, increased durometer | Severe blistering, yellowing | Blistering, cracking yellowing | Do. |
|  | 72 hours | No change | V. brittle and hard, yellowed | Severe cracking, yellowing | Do. |
|  | 96 hours | do | Severe cracking, yellowed | do | Do. |
|  | 7 days | do | Severe cracking blistering and yellowing. | Severe blistering, cracking, yellowing, v. high durometer. | Do. |
| $H_2S$ | 24 hours | Sl. yellowing, flexible | White | Sl. yellowing | White, flexible, no change. |
|  | 48 hours | Severe yellowing, flexible | Sl. yellowing | Color change from yellow to grey. | No change. |
|  | 72 hours | Yellowed | No change | Grey, flexible | Do. |
|  | 96 hours | do | do | do | Do. |
|  | 7 days | do | Yellowed | do | Do. |

EXAMPLE 2

In order to evaluate the effect of the filler load on the composition of this invention the seven compositions indicated in Table X were prepared. The results of the evaluations of these compositions is set forth in Table XI.

TABLE X

| Ingredients | Compositions (parts by weight) | | | | | | |
|---|---|---|---|---|---|---|---|
| | 1 | 2 | 3 | 4 | 5 | 6 | 7 |
| Emulsion of 92 mole percent $(CH_3)_2$SiO and 8 mole percent $C_6H_5SiO_{3/2}$ copolymer as described in Example 1 | 850 | 850 | 850 | 850 | 850 | 850 | 850 |
| 70% solution of octyl phenoxy polyethoxy ethanol in water | 8 | 6 | 8 | 8 | 8 | 10 | 6 |
| Pyrogenic silica filler | 8.5 | 7.5 | 8.5 | 8.5 | 8.5 | 8.5 | 7.5 |
| Wet ground calcium carbonate filler | 300 | 335 | 480 | 600 | 780 | 930 | 335 |
| Titanium dioxide filler/whitener | 50 | 50 | 50 | 50 | 50 | 50 | 50 |
| Ethylene glycol | 12 | 12 | 12 | 12 | 12 | 12 | 12 |
| 25% solution of $(C_2H_5O)_3SiCH_2CH_2CH_2NH_2$ in xylene | 20 | 20 | 20 | 20 | 20 | 20 | 20 |

TABLE XI

| Evaluation | Composition | | | | | | |
|---|---|---|---|---|---|---|---|
| | 1 | 2 | 3 | 4 | 5 | 6 | 7 |
| Percent fillers | 42 | 45 | 52 | 57 | 63 | 67 | 42 |
| Theory non-volatile materials (percent) | 68 | 69 | 72 | 74 | 76.5 | 78.2 | 69 |
| Non-volatile materials found (percent)[1] | 69 | 69.3 | 73 | 75 | 78 | 79 | 69.6 |
| Appearance | Good | Good | Good | Good | Good | Good | Fair-Good |
| Slump | Very slight | None | None | None | None | None | None |
| Freeze/thaw stability [2] | Excellent | Excellent | Excellent | Excellent | Excellent | Excellent | Excellent |
| 30 day D/T/E [3] | 23/61/283 | 39/95/233 | 25/57/233 | 28/65/167 | 34/74/92 | 28/49/92 | 45/130/200 |
| Percent shrinkage | 44 | 43 | 42 | 40 | 36 | 34 | 43 |
| Cracking in ⅜" joint | Severe | Slight | Slight | Slight | None | None | Severe |
| Wet adhesion glass | Fair | Fair | Fair | Fair | Fair | Fair | Good |
| Dry adhesion; Glass | Good | Good | Good | Good | Good | Good | Excellent |
| Ceramic | do | do | do | do | do | do | Do |

[1] Measured by heating 2 grams for 4 hours at 105° C.
[2] Measured by; 1 cycle=16 hrs. at −12° C. followed by 8 hr. at 72° F. sample passes a cycle if no gellation occurs.
[3] D is durometer measured by ASTM Test D676-58T, Shore A: T is tear strength measured by ASTM Test D412-51T, Die C: E is percent elongation measured by ASTM Test D412-51T, Die C.

EXAMPLE 3

A caulk composition was prepared which consisted essentially of 800 parts of a siloxane block copolymer cationic emulsion which contained about 60% solids, the siloxane copolymer being 88 mole percent $(CH_3)_2SiO$ units and 12 mole percent $C_6H_5SiO_{3/2}$ units, 12 parts of a 70% solution of octyl phenoxy polyethoxy ethanol in water, 300 parts of wet ground calcium carbonate, 50 parts titanium dioxide, 12 parts of ethylene glycol, 7.5 parts of pyrogenic silica, and 40 parts of a 25% solution of $(C_2H_5O)_3SiCH_2CH_2CH_2NH_2$ in xylene. The caulk had good consistency and good cure.

EXAMPLE 4

When the compositions set forth below are prepared in a manner similar to the above compositions, good caulks and adhesives are obtained.

(A) 300 parts of siloxane block copolymer composed of 80 mole percent $(CH_3)_2SiO$ units and 20 mole percent $C_6H_5SiO_{3/2}$ units, 250 parts distilled water, 20 parts dioctadecyldimethyl ammonium chloride, 5 parts of the dodecyl ether of tetraethylene oxide, 300 parts of wet ground calcium carbonate, and 5 parts of $$(CH_3O)_3Si(CH_2)_3NHCH_2CH_2NH_2$$

(B) 600 parts of a siloxane block copolymer composed of 95 mole percent $(CH_3)_2SiO$ units and 5 mole percent $C_6H_5SiO_{3/2}$ units, 300 parts demineralized water, 30 parts dihexadecyldimethyl ammonium chloride, 30 parts of the condensation product of ethylene oxide and sorbitan monolaurate, 600 parts of talc filler, 10 parts of silica filler, 20 parts ethylene glycol, and 20 parts 

That which is claimed is:

1. A composition which consists essentially of
   (a) 300 to 600 parts by weight of a siloxane block copolymer consisting essentially of 80 to 95 mole percent of $(CH_3)_2SiO$ units and 5 to 20 mole percent of $C_6H_5SiO_{3/2}$ units,
   (b) 250 to 300 parts by weight of water,
   (c) 20 to 30 parts by weight of a cationic surfactant,
   (d) 5 to 30 parts by weight of a nonionic surfactant,
   (e) 300 to 1000 parts by weight of at least one filler, and
   (f) 5 to 20 parts by weight of an aminofunctional alkoxy silane.

2. A composition as defined in claim 1 wherein
   (a) is a block copolymer of the ABA type where A represents the linear dimethylsiloxane portion and B represents the phenylsilsesquioxane portion,
   (b) is distilled, deionized or demineralized water,
   (c) is selected from the group consisting of arsonium, phosphonium, isothiouronium, hydrazonium, alkyl ammonium and quaternary ammonium salts,
   (d) is selected from the group consisting of saponines, and condensation products of ethylene oxide and fatty acids, sorbitan monolaurate, sorbitan trioleate, and phenolic compounds, and imine derivatives,
   (e) is selected from the group consisting of calcium carbonate, silica, diatomaceous earth, talc, and titanium dioxide, and
   (f) has the general formula $(RO)_3SiR'NHR''$ wherein R is an alkyl group containing from 1 to 4 carbon atoms, R' is an alkylene group containing from 3 to 18 carbon atoms, there being at least three carbon atoms of the R' group between the silicon atom and the nitrogen atom, and R'' is selected from the group consisting of the hydrogen atom, hydrocarbon radicals free of aliphatic unsaturation containing from 1 to 6 carbon atoms, and aminoalkyl radicals containing from 2 to 6 carbon atoms.

3. A composition as defined in claim 2 wherein
   (a) is about 92 mole percent dimethylsiloxane units and about 8 mole percent phenylsilsesquioxane units,
   (c) is tallow trimethyl ammonium chloride,
   (d) is octyl phenoxy polyethoxy ethanol,
   (e) is about 93% wet ground calcium carbonate, about 1% pyrogenic silica, and about 6% titanium dioxide, and
   (f) is $(C_2H_5O)_3SiCH_2CH_2CH_2NH_2$.

4. A composition as defined in claim 2 wherein
   (a) is about 88 mole percent dimethylsiloxane units and about 12 mole percent phenylsilsesquioxane units,
   (c) is tallow trimethyl ammonium chloride, $(CH_3O)_3SiCH_2CH(CH_3)CH_2NHCH_2CH_2NH_2$.

(d) is octyl phenoxy polyethoxy ethanol,
(e) is about 84% wet ground calcium carbonate, about 2% pyrogenic silica, and about 14% titanium dioxide, and
(f) is $(C_2H_5O)_3SiCH_2CH_2CH_2NH_2$.

References Cited

UNITED STATES PATENTS

| | | | |
|---|---|---|---|
| 2,891,920 | 6/1959 | Hyde et al. | 260—29.2 M |
| 3,377,306 | 4/1968 | Hyde | 260—29.2 M |
| 3,634,297 | 1/1972 | Campbell | 260—29.2 M |
| 3,702,769 | 11/1972 | Vaughn | 260—29.2 M |

MURRAY TILLMAN, Primary Examiner

A. H. KOECKERT, Assistant Examiner

U.S. Cl. X.R.

161—36; 260—46.5 G, 825